US006306531B1

(12) United States Patent
Clingerman et al.

(10) Patent No.: US 6,306,531 B1
(45) Date of Patent: Oct. 23, 2001

(54) COMBUSTOR AIR FLOW CONTROL METHOD FOR FUEL CELL APPARATUS

(75) Inventors: Bruce J. Clingerman, Palmyra, NY (US); Kenneth D. Mowery, Noblesville; Eugene V. Ripley, Russiaville, both of IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/565,781

(22) Filed: May 5, 2000

Related U.S. Application Data

(63) Continuation-in-part of application No. 09/345,127, filed on Jul. 6, 1999, now abandoned.

(51) Int. Cl.[7] .............................. H01M 8/04; H01M 8/06
(52) U.S. Cl. .................................. 429/19; 429/22; 429/26
(58) Field of Search .................................. 429/12, 13, 16, 429/17, 19–22, 24–26

(56) References Cited

U.S. PATENT DOCUMENTS

| | | |
|---|---|---|
| 4,128,700 | 12/1978 | Sederquist . |
| 4,293,315 | 10/1981 | Sederquist . |
| 4,555,454 | 11/1985 | Shuster . |
| 4,642,272 | 2/1987 | Sederquist . |
| 4,650,727 | 3/1987 | Vanderborgh et al. . |
| 4,659,634 | 4/1987 | Struthers . |
| 4,670,359 | 6/1987 | Beshty et al. . |
| 4,678,723 | 7/1987 | Wertheim . |
| 4,816,353 | 3/1989 | Wertheim et al. . |
| 4,923,768 | 5/1990 | Kaneko et al. . |
| 4,943,493 | * 7/1990 | Vartanian . |
| 4,994,331 | 2/1991 | Cohen . |
| 5,006,425 | * 4/1991 | Takabayashi . |
| 5,059,494 | * 10/1991 | Vartanian et al. . |
| 5,248,567 | 9/1993 | Amemiya et al. . |
| 5,271,916 | 12/1993 | Vanderborgh et al. . |
| 5,272,017 | 12/1993 | Swathirajan et al. . |
| 5,316,871 | 5/1994 | Swathirajan et al. . |
| 5,372,617 | 12/1994 | Kerrebrock et al. . |
| 5,429,886 | 7/1995 | Struthers . |
| 5,484,577 | 1/1996 | Buswell et al. . |
| 5,484,666 | 1/1996 | Gibb et al. . |
| 5,518,705 | 5/1996 | Buswell et al. . |
| 5,518,828 | 5/1996 | Senetar . |
| 5,554,453 | 9/1996 | Steinfeld et al. . |
| 5,605,770 | 2/1997 | Andreoli et al. . |
| 5,637,415 | 6/1997 | Meltser . |
| 5,702,838 | 12/1997 | Yasumoto et al. . |
| 5,763,113 | 6/1998 | Meltser et al. . |
| 5,789,091 | 8/1998 | Wozniczka et al. . |

OTHER PUBLICATIONS

Szaniszlo, "The Advanced Low–Emissions Catalytic–Combustor Program: Phase I—Description and Status," ASME #79–GT–192, Mar. 1979.
Krill et al., "Catalytic Combustion for System Applications," ASME #79–HT–54, Dec. 1979.
Hall et al., "A Porous Media Burner for Reforming Methanol for Fuel Cell Powered Electric Vehicles," SAE Paper #950095 Feb.–Mar./1995.

* cited by examiner

*Primary Examiner*—Carol Chaney
*Assistant Examiner*—Susy Tsang
(74) *Attorney, Agent, or Firm*—A. Luke Simon; Karl F. Barr; Linda M. Deschere

(57) ABSTRACT

A method for controlling the heat output of a combustor in a fuel cell apparatus to a fuel processor where the combustor has dual air inlet streams including atmospheric air and fuel cell cathode effluent containing oxygen depleted air. In all operating modes, an enthalpy balance is provided by regulating the quantity of the air flow stream to the combustor to support fuel cell processor heat requirements. A control provides a quick fast forward change in an air valve orifice cross section in response to a calculated predetermined air flow, the molar constituents of the air stream to the combustor, the pressure drop across the air valve, and a look up table of the orifice cross sectional area and valve steps. A feedback loop fine tunes any error between the measured air flow to the combustor and the predetermined air flow.

14 Claims, 7 Drawing Sheets

COMBUSTOR AIR FLOW CONTROL METHOD FOR FUEL CELL APPARATUS

CROSS REFERENCE TO RELATED APPLICATIONS

This application discloses subject matter which is disclosed and claimed in co-pending U.S. patent application, Ser. No. 09/358,080, now abandoned Attorney Docket No. H-202971, filed Jul. 21, 1999, in the names of David J. Hart-Predmore and William H. Pettit, and entitled "Methanol Tailgas Combustor Control Method," and the continuation thereof filed May 5, 2000 as Ser. No. 09/565,853, the entire contents of which are incorporated by reference.

This application is a continuation-in-part of U.S. Ser. No. 09/345,127, filed Jul. 6, 1999, now abandoned, in the names of Bruce J. Clingerman, Kenneth D. Mowery and Eugene V. Ripley, and entitled "Combustor Air Flow Control Method for Fuel Cell Apparatus."

STATEMENT OF GOVERNMENT SUPPORT

The Government of the United States of America has right in this invention pursuant to Agreement No. DE-AC02-90CH10435 awarded by the U.S. Department of Energy.

FIELD OF THE INVENTION

The present invention relates, in general, to electrochemical fuel cells and, more specifically, to combustors for heating a fuel processor.

BACKGROUND OF THE INVENTION

Fuel cells have been used as a power source in many applications. Fuel cells have also been proposed for use as a vehicular power plant to replace the internal combustion engine. In proton exchange membrane (PEM) type fuel cells, hydrogen is supplied to the anode side of the fuel cell and air or oxygen is supplied as the oxidant to the cathode side. PEM fuel cells include a "membrane electrode assembly" (a.k.a. MEA) comprising a thin, proton transmissive, solid polymer membrane-electrolyte having the anode on one of its faces and the cathode on the opposite face. The MEA is sandwiched between a pair of electrically conductive elements which (1) serve as current collectors for the anode and cathode, and (2) contain appropriate channels and/or openings therein for distribution the fuel cell's gaseous reactants over the surfaces of the respective anode and cathode catalysts. A plurality of individual cells are commonly bundled together to form a PEM fuel cell stack.

For vehicular applications, it is desirable to use a liquid fuel such as an alcohol (e.g., methanol or ethanol), or hydrocarbons (e.g., gasoline) as the fuel for the vehicle owing to the ease of on-board storage of liquid fuels and the existence of a nationwide infrastructure for supplying liquid fuels. However, such fuels must be dissociated to release the hydrogen content thereof for fueling the fuel cell. The dissociation reaction is accomplished heterogeneously within a chemical fuel processor, known as a fuel processor, that provides thermal energy throughout a catalyst mass and yields a reformate gas comprising primarily hydrogen and carbon dioxide. For example, in the steam and methanol reformation process, methanol and water (as steam) are ideally reacted to generate hydrogen and carbon dioxide according to this reaction:

$$CH_3OH + H_2O \rightarrow CO_2 + 3H_2.$$

The reforming reaction is an endothermic reaction that requires external heat for the reaction to occur. The heat required to produce enough hydrogen varies with the demand put on the fuel cell system at any given point in time. Accordingly, the heating means for the fuel processor must be capable of operating over a wide range of heat outputs. Heating the fuel processor with heat generated externally from either a flame combustor or a catalytic combustor is known. U.S. patent applications Ser. Nos. 08/975,422 and 08/980,087 filed in the name of William Pettit in November, 1997, and assigned to the assignee of the present invention, disclose an improved catalytic combustor, and the integration thereof with a fuel cell system which fuels the combustor with unreformed liquid fuel, hydrogen-containing anode exhaust gas from the fuel cell, or both. The operating cycle depends on many factors, such as anode stoichiometry, steam/carbon ratio, electrical demand placed on the system, etc.

Load changes placed on the fuel cell resulting in greater or lower power output requirements, results in the fuel processor generating more or less hydrogen. Correspondingly, since the combustor generates whatever heat input is required to sustain the chemical reactions within the fuel processor, the combustor likewise must generate more or less heat to maintain the required reaction temperatures within the fuel processor. The temperature control of the combustor is dependent upon several parameters, an important one being the air flow to the combustor.

What is needed in a vehicular fuel cell application is a fast response to fuel cell load changes. However, air flow control devices using simple feedback to control the air flow to the combustor demonstrate slow response times.

Another problem results from the use of cathode effluent as an air source to the combustor. Such cathode effluent is typically oxygen depleted after exiting the fuel cell such that the actual constituent makeup of the cathode effluent, in terms of water, nitrogen and oxygen differs from that found in normal air. As the air to the combustor is taken from two different sources depending upon the mode of operation of the fuel cell apparatus, i.e., start-up, warm-up, normal operating run mode, etc., conventional sensors which merely measure air or mass flow rates do not take into account the constituent makeup of such air which may have a deleterious effect on the temperature in the combustor.

Thus, it would be desirable to provide an air flow control method for a fuel cell apparatus which has a fast response to load changes, utilizes closed loop control with conventional automotive sensors and actuators and automatically compensates for molar fraction deviations of oxygen depleted air in the air flow stream to the combustor.

SUMMARY OF THE INVENTION

A method of operating a combustor to heat a fuel processor in a fuel cell apparatus in which the fuel processor generates hydrogen from a hydrocarbon fuel for supplying a fuel cell, the fuel cell discharging an anode effluent containing hydrogen and a cathode effluent containing oxygen, the method comprising the steps of:

providing a fuel stream to the combustor;

providing an air flow stream to the combustor, the air flow stream including at least one of a first air source and cathode effluent from the fuel cell;

determining the power input requirement of the fuel processor;

determining the output power of the combustor to support the determined power requirement of the fuel processor; and regulating the air flow stream to the combustor to control the temperature of the combustor.

In one aspect, the regulation step comprises controlling the direction of air flow. Preferably, this is accomplished by directing the air either primarily through the cathode portion of the stack and to the combustor, or primarily directing the air in a path directly to the combustor. The later is referred to as stack-bypass.

In another aspect, the regulating step comprises the step of controlling the cross sectional area of an orifice of an air flow regulator or valve in the air stream in response to the constituent makeup of the air stream.

The control method also includes the step of limiting the cross sectional area of an air flow regulator orifice to a maximum or a minimum cross sectional area.

In still another aspect of the present method, the regulating step includes connecting an air flow valve to an external exhaust to bleed air from the air stream input to the combustor.

According to one aspect, the air flow regulator or valve is an air flow device having a variable cross sectional orifice which can be varied in a discrete number of steps by a stepper motor operator between full valve open and full valve closed positions. The orifice has a known cross sectional area at each discrete step. The inventive method determines the desired air flow through the valve based on certain input parameters, sensors and empirically obtained daita, to adjust the orifice to the cross sectional area which is capable of supplying the desired air flow.

Finally, in the present control method, the method also includes the step of summing the first cross-sectional area of the orifice of the air flow regulator with an error signal representing the difference between the measured actual air flow to the combustor and the predetermined air flow. Preferably, according to one aspect of the invention, the error signal is generated by a PID controller.

BRIEF DESCRIPTION OF THE DRAWINGS

The various features, advantages and other uses of the present invention will become more apparent by referring to the following description and drawings in which.

DESCRIPTION OF THE PREFERRED EMBODIMENTS

The invention is hereafter described in the context of a fuel cell fueled by a methanol (MeOH) fuel processor. However, it is to be understood that the principles embodied herein are equally applicable to fuel cells fueled by other fuels, such as ethanol or gasoline, which utilize a fuel processor for conversion into a hydrogen rich stream.

Figure 1:
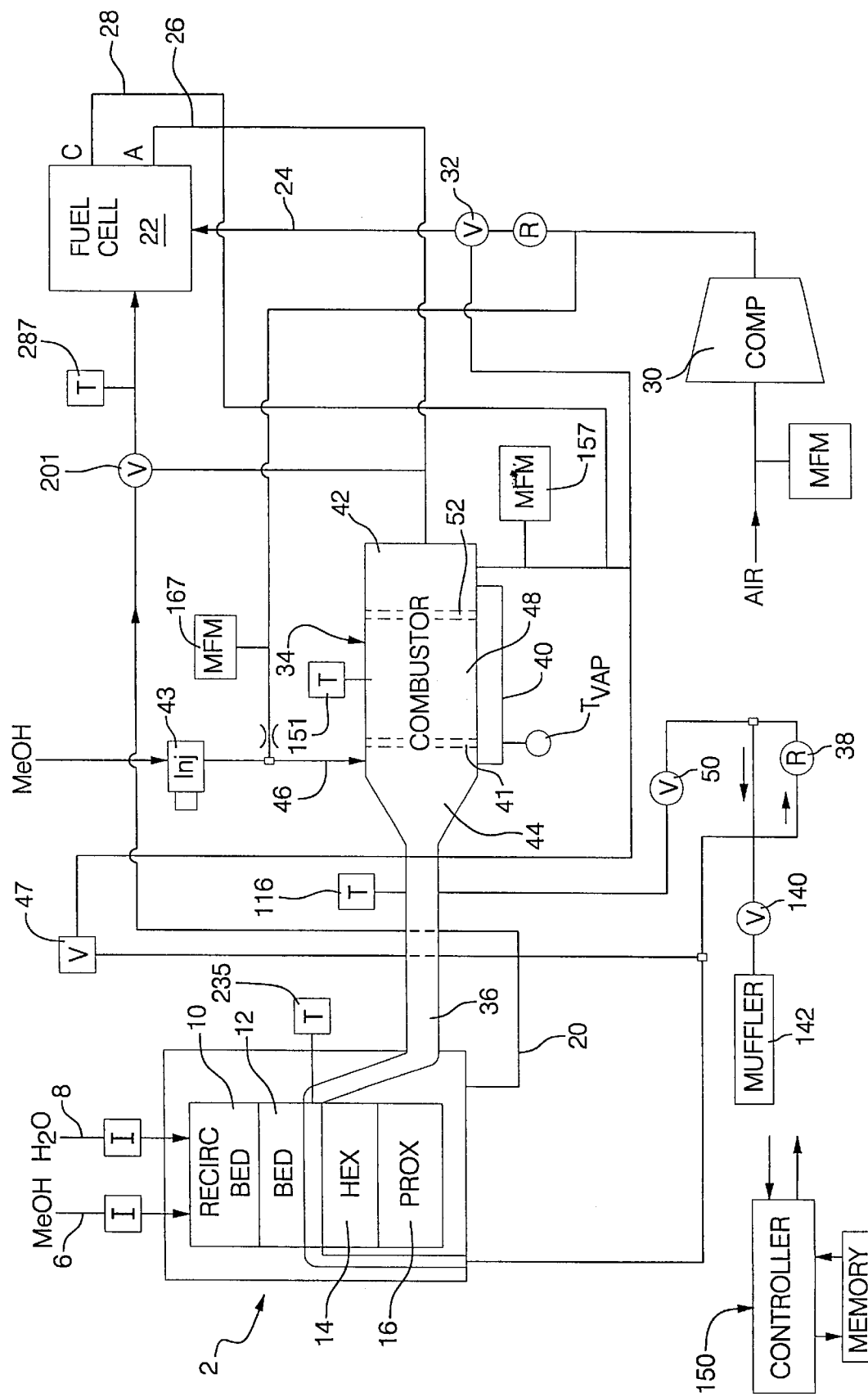
FIG. 1 is a schematic diagram of a fuel cell apparatus according to the present invention.

As shown in FIG. 1, a fuel cell apparatus includes a fuel processor 2 for catalytically reacting methanol from a methanol stream 6 and water or steam from a water stream 8 in a recirculating bed 10 and a catalytic bed 12 to form a hydrogen-rich reformate gas stream. A heat exchanger 14 is interposed between the catalytic bed 12 and a preferential oxidation (PROX) reactor 16. The reformate output gas stream comprises primarily $H_2$ and $CO_2$, but also includes $N_2$, CO and water. The reformate stream passes through the preferential oxidation (PrOx) reactor 16 to reduce the CO-levels therein to acceptable levels (i.e., below 20 ppm). The $H_2$ rich reformate 20 is then fed into the anode chamber of a fuel cell 22. At the same time, oxygen (e.g., air) from an oxidant stream 24 is fed into the cathode chamber of the fuel cell 22. The hydrogen from the reformate stream 20 and the oxygen from the oxidant stream 24 react in the fuel cell 22 to produce electricity.

Exhaust or effluent 26 from the anode side of the fuel cell 22 contains some unreacted hydrogen. The exhaust or effluent 28 from the cathode side of the fuel cell 22 contains some unreacted oxygen. The terms effluent and exhaust are used herein interchangeably. Air for the oxidant stream 24 is provided by a compressor 30 and is directed to the fuel cell 22 by a valve 32 under normal operating conditions. During start-up, however, the valve 32 is actuated to provide air to the input of a combustor 34 used to heat the fuel processor 2, as will be described in more detail hereinafter.

Heat from the heat exchanger 14 heats the catalyst bed(s) 10 and 12 in the fuel processor 2 and also heats the PROX 16. In this regard, the $H_2O$—MeOH mixture supplied to the fuel processor 2 will be vaporized and preferably be recirculated/refluxed several times (e.g., 20×) through the recirculating bed 10 in the fuel processor 2, the heat exchanger side of the bed 12, the PROX 16 and the heat exchanger 14 such that the mixture also functions as a heat transfer medium for carrying heat from the heat exchanger 14 into the beds 10 and 12 of the fuel processor 2 and to the PROX 16.

The heat exchanger 14 itself is heated from exhaust gases 36 exiting the catalytic combustor 34. The gases 36 exiting the heat exchanger 14 are still hot and could be passed through an expander, not shown, which could drive the compressor 30 or utilized in another manner. In the present implementation, as shown in FIG. 1, the exhaust gases from the combustor 34 are used to heat the fuel processor 2 pass through a regulator 38, a shutoff valve 140 and a muffler 142 before being dumped to atmosphere.

MeOH vapor 40 emanates from a vaporizer 41 nested in the exhaust end 44 of the combustor 34. The vaporizer 41 is a heat exchanger that extracts heat from the combustor 34 exhaust to vaporize a first fuel stream, such as liquid MeOH 46 provided o the vaporizer 41 by fuel metering device 43 from the vehicle's fuel tank. The MeOH vapor 40 exiting the vaporizer 41 and the anode effluent 26 are reacted in a catalyst section 48 of the combustor 34 lying intermediate the inlet and exhaust ends 42 and 44 respectively of the combustor 34. Oxygen is provided to the combustor 34 either from the compressor 30 (i.e., via valve 32) or from a second air flow stream, such as a cathode effluent stream 28 depending on system operating conditions. A valve 50 permits dumping of the combustor exhaust 36 to atmosphere when it is not needed in the fuel processor 2.

Further details concerning the construction of the combustor 34 can be had by referring to pending U.S. patent applications Ser. Nos. 08/975,422 and 08/980,087 filed in the name of William Pettit in November 1997, the entire contents of which are incorporated herein by reference.

An electric heating element (EHC) 52 is provided upstream of the catalyst bed 48 in the combustor 34 and serves to vaporize the liquid fuel 46 entering the combustor 34, heat the gas entering the bed 48 as well as preheating the bed 48 during start-up of the combustor 34. The heating element 52 may or ray not be catalyzed. After start-up, as described hereafter, the electric heater 52 is no longer required since the fuel will be vaporized by the exhaust gases emanating from the exhaust end 44 of the combustor 34. A preferred electric heater 52 comprises a commercially available, uncatalyzed extruded metal monolith resistance element such as is used to light off the catalyst of a catalytic converter used to treat IC engine exhaust gases.

The exhaust end 44 of the combustor 34 includes a chamber that houses the vaporizer 41 which is a coil of metal tubing which is used to vaporize liquid fuel to fuel the combustor 34. More specifically, under normal post-start-up conditions, air or cathode effluent 28 may be introduced into the inlet end of the coil and mixed with liquid fuel sprayed into the inlet end via a conventional automotive type fuel injector. The airborne atomized fuel passes through the several turns of the heated coil tube, and therein vaporizes and exits the tube at an outlet which is located in the cathode effluent supply conduit. This vaporized first fuel stream supplements a second fuel stream or anode effluent 26 as fuel for the combustor 34 as may be needed to meet the transient and steady state needs of the fuel cell apparatus. The vaporizer coil is sized to vaporize the maximum flow rate of fuel with the minimum combustor exhaust flow rate, and is designed to operate at temperatures exceeding the autoignition temperature of the MeOH-air mixture therein throughout its fuel operational range. Autoignition within the vaporizer is avoided, however, by insuring that the velocity of the mix flowing through the coil significantly exceeds the worst-case flame speed of the mixture which varies with the composition of the inlet streams.

As shown in FIG. 1, ant as described in greater detail hereafter, the amount of heat demanded by the fuel processor 2 which is to be supplied by the combustor 34 is dependent upon the amount of fuel and water input to the fuel processor 2. The greater the supply of fuel and water, the more heat energy the reformer will need. To supply the heat demand of the fuel processor 2, the combustor 34 utilizes all anode exhaust or effluent and potentially some liquid fuel. Enthalpy equations are used to determine the amount of cathode exhaust or air to be supplied to the combustor 34 to meet the desired temperature requirements of the combustor 34, and the combustor 34 ultimately satisfies the heat demanded by the fuel processor 2. The oxygen, air, or air like stream provided to the combustor 34 includes one or both of cathode effluent exhaust 28 which is typically a percentage of the total oxygen supplied to the cathode of the fuel cell 22 and a compressor output air stream depending on whether the apparatus is operating in a start-up mode wherein the compressor air stream is exclusively employed or in a run mode using the cathode effluent 28 and/or compressor air. In the run mode, any total air, oxygen or diluent demand required by the combustor 34 which is not met by the cathode effluent 28 is supplied by the compressor 30 in an amount to balance the enthalpy equations, and to satisfy the temperature and heat demanded by the combustor 34 and the fuel processor 2, respectively.

The air quality control is implemented via an air dilution valve 47 which is a stepper motor driven valve having a variable orifice to control the amount of bleed-off of cathode exhaust supplied to the combustor 34 and potentially the system exhaust, which bled-off air is dumped to atmosphere through the regulator 38, the valve 140, and the muffler 142. A further description of the air dilution valve 47 will be presented hereafter in conjunction with the various modes or sequences of operation of the combustor 34.

The fuel cell apparatus of the present invention operates as follows. At the beginning of operations when the fuel cell apparatus is cold and starting up: (1) the compressor 30 is driven by an electric motor energized from an external source (e.g., a battery) to provide the necessary system air; (2) air is introduced into the combustor 34 as well as the input end of the vaporizer 41; (3) liquid fuel 46 (e.g., MeOH) is injected into the inlet end of the vaporizer 41 via a fuel injector, and atomized as fine droplets with the air flowing therein; (4) the air-MeOH droplet mix exits the vaporizer 41 and mixes with compressor air introduced into the combustor 34, and is then introduced into the input end 42 of the combustor 34; (5) the mix passes through a flame arrestor in the front of the combustor 34; (6) the mix is then heated by the heater 52 to vaporize the liquid droplets and heat the mixture; (7) the preheated vaporous mix then enters a mixing-media bed for still further intimate mixing before contacting the light-off catalyst bed; (8) upon exiting the mixing-media bed, the mix begins oxidizing on the light-off catalyst bed just before it enters a primary catalyst bed 48, or reacting section of the combustor 34, where substantially complete combustion of the fuel is effected; and (9) the hot exhaust gases exiting the catalyst bed are conveyed to the heat exchanger 14 associated with the fuel processor 2.

Once the fuel processor's temperature has risen sufficiently to effect and maintain the reformation process: (1) valve 32 is activated Ho direct air to the cathode side of the fuel cell 22; (2) MeOH and water are fed to the fuel processor 2 to commence the reformation reaction; (3) reformate exiting the fuel processor 2 is fed to the anode side of the fuel cell 22; (4) anode effluent 26 from the fuel cell 22 is directed into the combustor 34; (5) cathode effluent 28 from the fuel cell 22 is directed into the combustor 34; (6) air is introduced into the vaporizer 41; (7) liquid methanol is sprayed into the vaporizer 41; (8) the methanol-air mix circulates through the heated vaporizer coil where the MeOH vaporizes; (9) the methanol-air mix along with the cathode effluent 28 then mixes with the anode effluent 26; and (10) the mix is burned on the catalyst bed of the combustor 34.

During normal (i.e., post start-up) operating conditions, the heater 52 is not used as the vaporizer 41 alone vaporizes the MeOH and preheats the MeOH-air mix. Under certain conditions, as described hereafter, the combustor 34 could operate solely on the anode and cathode effluents, without the need for additional MeOH fuel from the vaporizer 41. Under such conditions, MeOH injection to the combustor 34 is discontinued. Under other conditions, e.g., increasing power demands, supplemental fuel is provided to the combustor 34.

As described above, the combustor 34 receives multiple fuels, such as a methanol-air mix as well as anode effluent 26 from the anode of the fuel cell 22. Oxygen depleted exhaust air 28 from the cathode of the fuel cell 22 and air from the compressor 30 are also supplied to the combustor 34.

According to the present invention, a controller 150 shown in FIG. 1 controls the operation of the combustor 34. Anode exhaust or effluent plus a liquid fuel, i.e., methanol, if required, support the energy requirements of the combustor 34. An enthalpy balance maintains the desired reaction temperature by controlling the amount of air and/or cathode exhaust supplied to the combustor 34 to meet all fuel processor heat requirements.

It should be noted that the energy requirements of the apparatus components are expressed herein in terms of power. This is for convenience and is meant to express an energy rate, often in units of kilowatts, rather than BTU per second.

The controller 150 may comprise any suitable microprocessor, microcontroller, personal computer, etc., which has central processing unit capable of executing a control program and data stored in a memory. The controller 150 may be a dedicated controller specific to the combustor 34 or implemented in software stored in the main vehicle electronic control module. Further, although the following description describes a software based control program for controlling the combustor 34 in various modes of operation or sequence, it will also be understood that the combustor control can also be implemented in part or whole by dedicated electronic circuitry.

According to the present invention, the controller 150 controls the operation of the combustor 34 in six different modes or sequences of operation. The separate modes of operation include (1) combustor start-up, (2) combustor operation during fuel processor warm-up, (3) combustor operation during fuel processor start-up, with the fuel cell off-line, (4) combustor operation during fuel processor run mode with the fuel cell stack on-line, and (5) combustor shut down. Each of these control sequences will be described with reference to the figures and to the equations in Table 1.

The various sensors, actuators, and devices which supply input signals to the controller 150 or are controlled by output signals from the controller 150 will be described in conjunction with the appropriate sequence step described hereafter.

Combustor Start-Up

Figure 2:
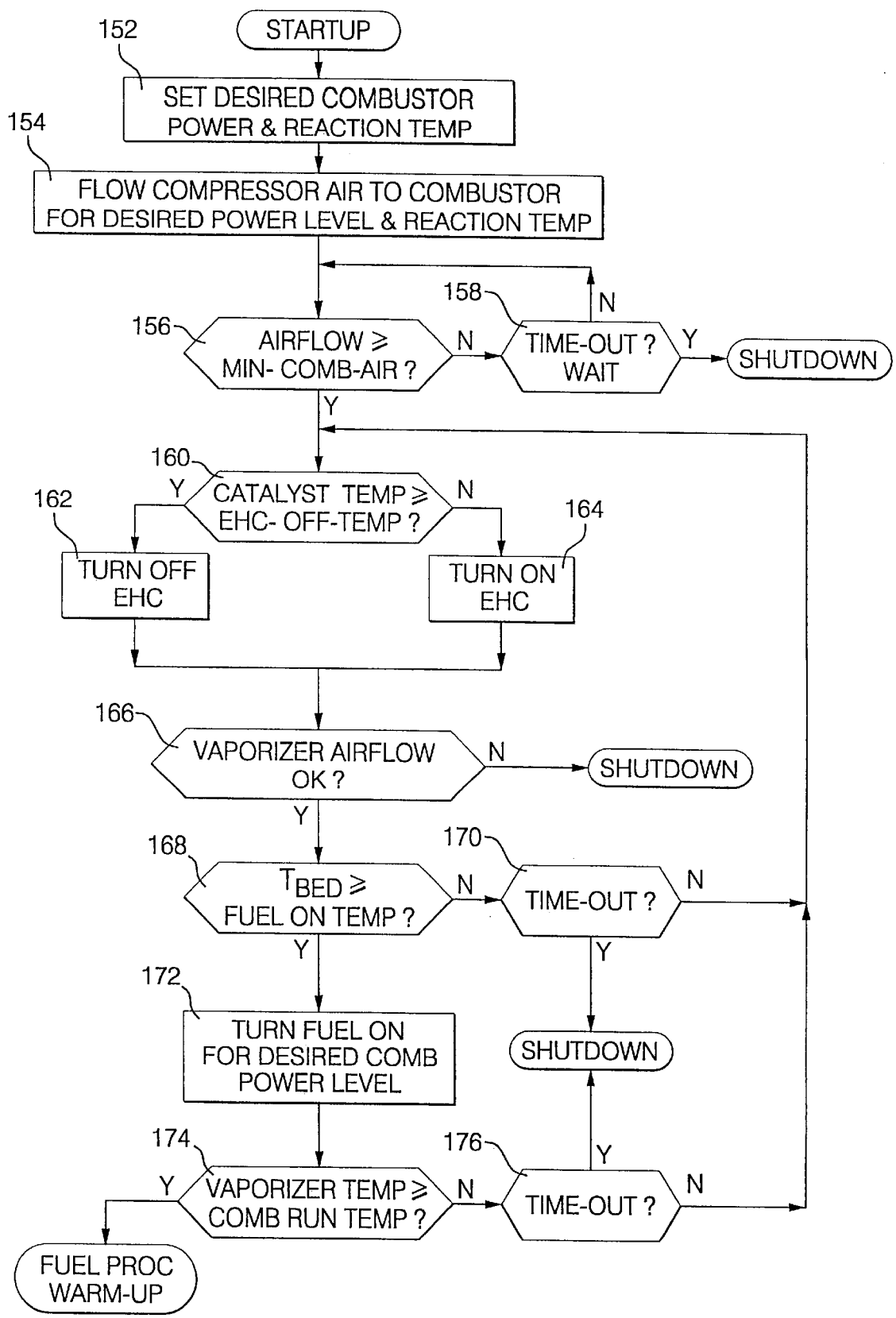
FIG. 2 is a flow diagram depicting the combustor start-up control sequence according to the present invention.

Turning now to FIG. 2, there is depicted the sequence of program steps performed by the controller 150 to control the combustor 34 during a start-up mode or sequence.

Initially, the controller 150 in step 152 selects the start-up combustor power level and reaction temperature. These values are base on a particular combustor performance and overall system requirements for warm-up times since, at this point in the operation of the engine, the fuel processor 2 and the fuel cell 22 are inactive and there is no hydrogen available at start-up of the combustor 34 from the fuel cell 22 or from the fuel processor 2. Other methods include a quick start fuel processor and stack or on-board hydrogen or reformate storage.

The controller 150 switches the air bypass valve 32 to a position diverting all air output flow from the compressor 30 to the combustor 34. The controller 150 regulates the compressor 30 to provide the desired air flow to the combustor 34 for the selected power level and reaction temperature in step 154. The controller 150 also controls the orifice size of the stepper motor, as described hereinafter, driven air dilution valve 47 to provide selected bleed-off of the air supplied to the combustor 34 in order to balance the enthalpy of the reaction in the combustor 34 by determining the amount of air flow required in the combustor 34 to create a desired reaction temperature within the combustor given the heat requirements demanded by the fuel processor 2.

Since no hydrogen is available at combustor start-up, all power for combustor operation must come from another fuel, such as methanol. The controller 150 uses equations 1, 2, and 16 in Table 1 to determine the desired methanol flow and air flow required to obtain the combustor reaction temperature calculated using equations 4–15 in Table 1.

The controller 150 in step 156 then compares the air flow to the compressor 30 as measured by a mass flow meter with a minimum combustor air flow. If the measured air flow is less than the preset minimum combustor air flow, the controller 150 enters a timeout loop in step 158 which sets a time limit for the combustor 34 to reach the desired air flow level. If time expires in the timeout loop in step 156, the controller 150 switches to a combustor shutdown sequence described hereafter.

When the measured air flow exceeds the preset minimum combustor air flow, the controller 150 in step 160 checks a sensor or thermocouple 151 to determine the temperature of the catalyst bed 48 in the combustor 34. If the temperature of the bed 48 exceeds the heater 52 preset turnoff temperature, the controller 150 turns off the heater 52 in step 162. If the temperature of the bed in step 160 is less than the heater turnoff temperature, the controller 150 turns on the heater in step 164.

Next, in step 166, the controller 150 determines the vaporizer air flow from the output of a mass flow meter 167 and compares the measured air flow with a minimum air flow set point. If the measured vaporizer air flow is less than the set point, the combustor shutdown sequence is executed. However, if the vaporizer air flow is above the minimum air flow set point, the controller 150 next determines if the temperature of the catalyst bed 48 in the combustor 34, as measured by sensor 151, exceeds a minimum temperature set point. If the temperature of the bed is less than the minimum temperature set point, a timeout loop in step 170 is executed which routes control back through steps 160–168 as long as time remains in the timeout period. Eventually, if the timeout period in the timeout loop in step 170 is exceeded and the temperature of the combustor bed has not reached the set point temperature, the controller 150 executes the combustor shutdown sequence.

When the measured temperature of the combustor bed 48 equals or exceeds the minimum set point temperature, the controller 150 turn the methanol fuel flow on via fuel injector 43 at a desired combustion power level as set in step 172.

The controller 150 then measures the vaporizer 41 temperature in step 174 from sensor Tvap and compares the measured vaporizer temperature with a set point temperature for running the combustor 34 at full power. If the vaporizer temperature is less than the set point run temperature, a timeout loop 176 is entered to allow time for the vaporizer temperature to come up to set point. Eventually, if the timeout: period is exceeded without a temperature match, the combustor shutdown sequence is executed.

Fuel Processor Warm-up

Figure 3:
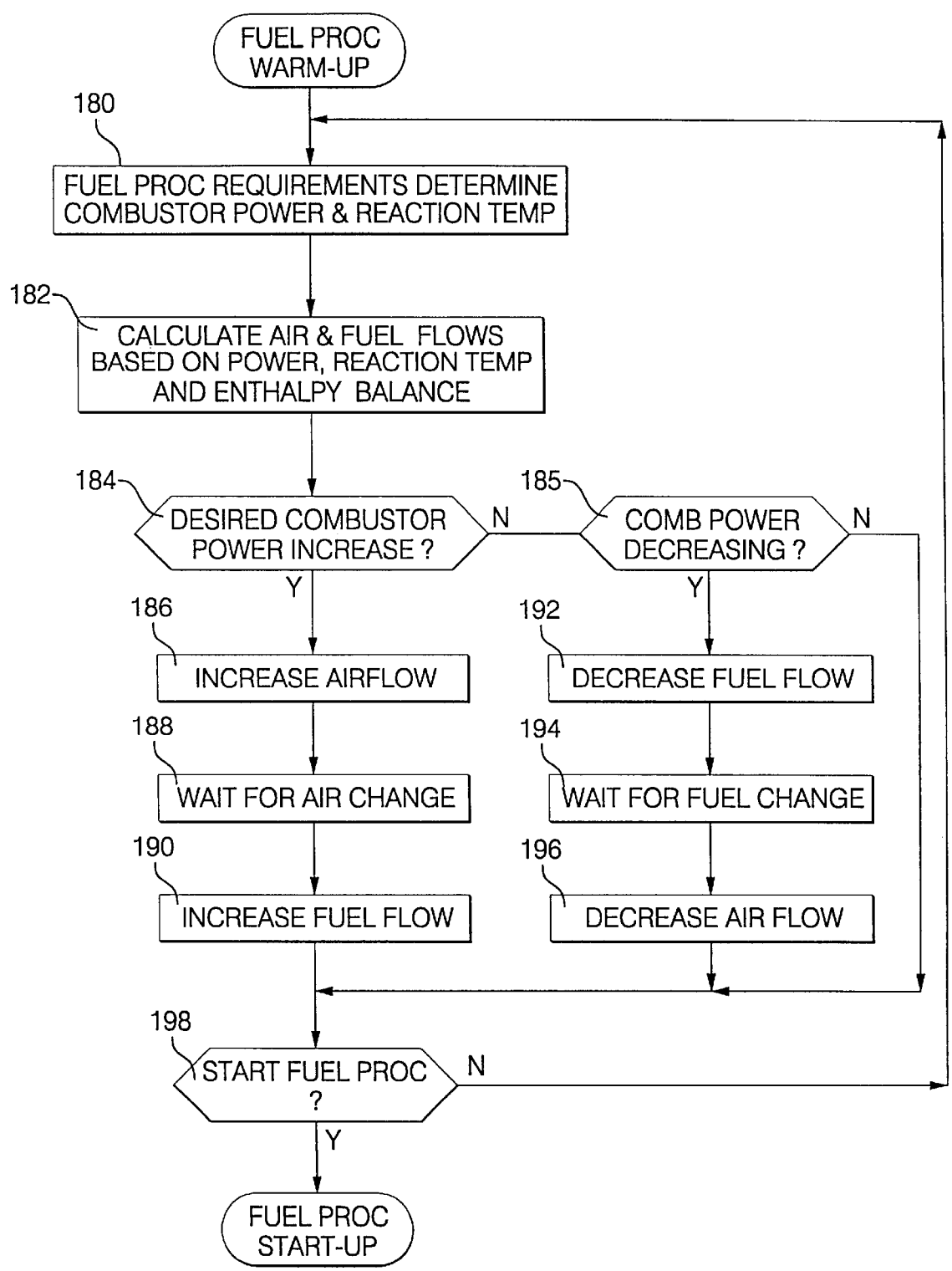
FIG. 3 is a flow diagram depicting the fuel processor warm-up combustor control sequence according to the present invention.

When the temperature of he vaporizer 41 equals or exceeds the minimum set point run temperature in step 174, the combustor start-up sequence is completed and the controller then executes the fuel processor warm-up sequence shown in FIG. 3. In step 180, the controller 150 sets the combustor power level and reaction temperature based on the system requirements for warming up the fuel processor 2 to a preset temperature. If stored hydrogen is not available, all of the combustor power comes from the liquid fuel. The controller 150 uses equations, 1, 2, and 16 to calculate the methanol flow. The air flow required to obtain the desired combustor reaction temperature is calculated by the controller 150 in step 182 using equations 4–15 and controlled by the air dilution valve 47.

The controller 150 using feedback from the fuel processor 2 then determines in step 184 if the output power of the combustor 34 is desired to be increased. If not so desired, then in step 185 it is determined whether combustor power is decreasing. If not, the fuel processor is started at step 198. If combustor power is decreasing, then proceed to step 192.

If in step 184 it is desired that combustor power be increasing, then at step 186 the controller 150 increases the air flow to the combustor 34 in step 186 and then waits in step 188 for the air flow to increase as measured by a change in the combustor exhaust temperature from a sensor or thermocouple 116. This wait period can be a programmed time delay, or a period based on feedback from either an air flow meter, a temperature decrease in the combustor catalyst bed, or a pressure increase in the combustor manifold. Once the wait period has been exceeded, the controller 150 then increases the methanol flow to the combustor 34 in step 190.

In the event that the controller 150 determines that the combustor power is decreasing in step 185, the controller 150 decreases the methanol flow to the combustor 34 in step 192. Another await period 194 is executed for the fuel flow to decrease to the set amount. This wait period can be a programmed time delay, or based on feedback from either a methanol flow meter, a temperature decrease in the combustor catalyst bed, or a pressure decrease in the combustor manifold. Once the desired fuel flow decrease has occurred, the controller 150 in step 196 decreases the air flow to the combustor 34 for proper reaction power and temperature.

At the end of either step 185, 190 or 196, the controller 150 determines in step 108 if the fuel processor 2 is ready for start-up. If not, steps 180 through 196 are re-executed as described above until the fuel processor 2 is ready for start-up.

As can be seen from the above steps, a change in air flow leads a change in fuel flow when power is increasing and a change in fuel flow leads a change in air flow when power is decreasing.

Fuel Processor Start-up—Fuel Cell Offline

Figure 4:
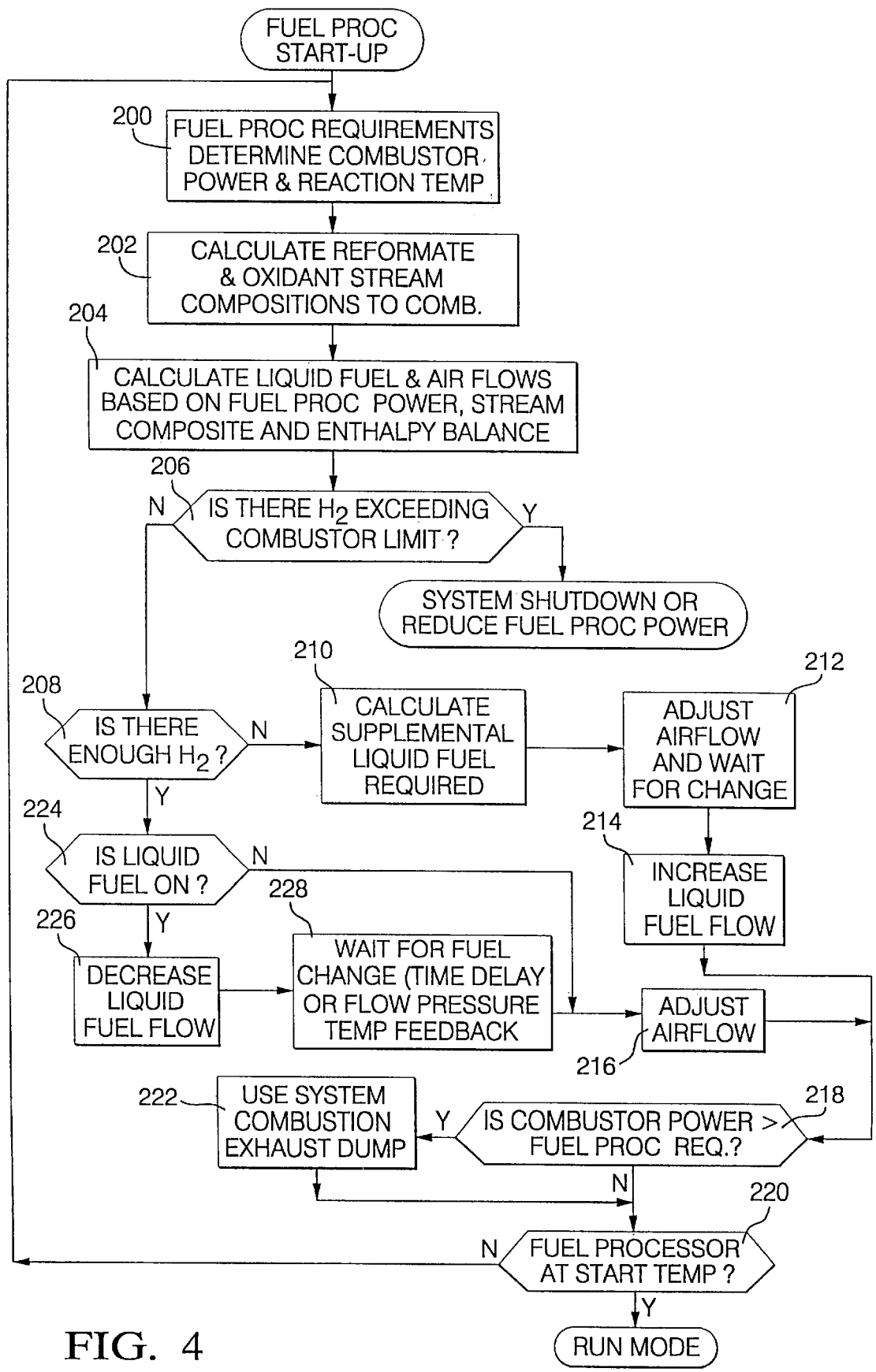
FIG. 4 is a flow diagram depicting the fuel processor start-up combustor control sequence according to the present invention.

At this point, control switches to the fuel processor start-up sequence shown in FIG. 4. In step 200, the fuel processor requirements, such as the operating temperature of the fuel processor catalyst and the desired fuel processor output power (equivalent kilowatts of hydrogen production), are used to determine the combustor power and reaction temperature required to meet the system requirements to start-up the fuel processor 2 to a steady state run temperature. During fuel processor 2 start-up, the fuel processor 2 is operated at an output (hydrogen/effluent production) level that the combustor 34 can consume.

As is conventional, during fuel processor 2 start-up, water and fuel (i.e., methanol) are injected into the fuel processor 2 which produces hydrogen and CO, plus other effluent gases, such as $H_2O$ and $CO_2$. Also, air is injected into the PrOx 16, which consumes some of the gases and, particularly, hydrogen, produced in the fuel processor 2. Thus, a power equivalent of $H_2$ and CO is able to be calculated and it is this output which is circulated to the combustor 34 when the quantity of CO is unacceptable for use by the fuel cell stack 22.

Since, at start-up, the temperature of the fuel processor 2 is not up to a steady state run temperature causing higher than desirable carbon monoxide levels to be present in the reformate, the entire output of the fuel processor 2 is recirculated to the combustor 34 as fuel through a fuel bypass valve 201 which supplies the fuel processor output gas stream to a second inlet on the combustor 34. Bypass air is also supplied to the combustor 34 through air bypass valve 32 to cause combustion of the reformate from the fuel processor 2. Preferably valve 32 is a proportional air bypass valve. The total amount of air from the compressor 30 supplied to the combustor 34 is regulated by one or more of the following: variable compressor speed; the position of the proportional air bypass valve 32; and the diameter of the air dilution valve 47; or the position of valve 47. Thus, the output flow of valve 47 is preferably adjusted by controlling the diameter of an output flow orifice of valve 47. The air supplied to the combustor is also controllable by changing the position of valve 32 in the valve body from open to closed or to an intermediate position such as partially open or partially closed. In that regard, equations 1–16 are useful.

The amount of hydrogen in the reformate stream which is supplied to the combustor 34 is calculated by the controller 150 in step 202 based on a given amount of fuel and water injected into the fuel processor 2 which react to make a given amount of hydrogen, carbon monoxide, carbon dioxide and water. The controller 150 also takes into account the injection of a certain amount of air into the PrOx reactor 16 and, based on the amount of air input to the PrOx reactor 16, a determination is made of how much hydrogen generated by the fuel processor 2 is consumed by the PrOx 16. From these calculations, the controller 150 determines the equivalent power (i.e., hydrogen) output from the fuel processor 2.

The controller 150 then compares the calculated or determined hydrogen quantity generated by the fuel processor 2 and supplied to the combustor 34 with the calculated fuel processor start-up power and reaction temperature requirements, taking into account heat generated by the PrOx 16, and, in step 204, calculates the supplemental amount of methanol and oxidant stream flow rates to the combustor using equations 1–16 in Table 1, with the diameter of the orifice of the air dilution valve 47 controlled to balance the enthalpy of the combustor reaction. For example, assuming that, on start-up, the fuel processor 2 produces 30 kilowatts equivalent of hydrogen which is supplied to the combustor 34. However, if the fuel processor 2 is demanding 35 kilowatts equivalent since it is not up to a steady state temperature, the combustor power requirement is also 35 kilowatts, and the combustor 34 will use 30 kilowatts of equivalent fuel from the fuel processor 2 and will require 5 kilowatts of additional methanol. Equations 1–16 are solved to determine how much air is required to generate a desired gas stream temperature at this amount of power. The control program insures that the maximum power possible is obtained first from the output of the fuel processor 2, including any heat generated by the PrOx 16, before additional quantities of methanol are used.

It should be noted that the fuel processor warm-up and fuel processor start-up control sequences for the combustor 34 can be utilized from an initial cold start of the fuel cell apparatus where the engine has been sitting idle for a long period of time and has reached ambient temperature or employed when the engine has been turned off only for a short period of time such that residual heat remains in the fuel processor and combustor catalyst beds. During a quick restart of the engine, it is possible that the fuel processor 2 could generate acceptable levels of reformate, e.g., low amounts of carbon monoxide, from the start.

Referring again to FIG. 4, in step 206 the controller 150 checks if the hydrogen level supply to the combustor 34 exceeds the fuel processor heat requirement or the combustor maximum design power output. If there is excess hydrogen, the controller 150 switches to the combustor shutdown sequence. Alternatively, the fuel processor power could be reduced. If there is not excess hydrogen in step 206, a determination is made in step 208 if there is a sufficient quantity of hydrogen supplied from the fuel processor 2 to the combustor 34. If there is insufficient hydrogen, the controller 150 in step 210 calculates the supplemental amount of methanol required to obtain the desired fuel processor temperature. Again, maximum power is obtained first from the output of the fuel processor 2 and then from methanol. In making this calculation, the controller executes equations 1–3 and 16 in Table 1. Based on the calculated values in step 210, the controller 150 adjusts the air flow to the combustor 34 by changing the cross section of the orifice of the valve 47 in step 212, waits for the desired air flow change, and then increases liquid methanol fuel flow in step 214 to the combustor 34. The controller 150 adjusts the fuel flow rate in step 214 using the equations in Table 1 based on the fuel energy content.

Next, in step 218, the controller 150 determines if the combustor power output is greater than the fuel processor power requirement. If the answer is no, the controller 150 checks in step 220 if the system is ready to enter a run mode for fuel cell operation. If not, control switches back to step 200 and steps 200–220 are re-executed.

If the combustor power output is greater than the fuel processor requirement, the controller 150 in step 222 opens the combustion exhaust diverter valve 50 to divert or dump combustor exhaust to atmosphere.

Referring back to step 208, if there is enough hydrogen to support fuel processor operation, the controller in step 224 determines if there is methanol fuel flow to the combustor 34. If the answer is yes, the controller 150 in step 226 decreases the amount of the liquid fuel flow to the combustor 34 to a level required to meet fuel processor combustion power requirements. A wait period is executed in step 228 for a fuel flow is change, which can be a programmed time delay, or based on feedback from a fuel flow meter, or a temperature decrease in the combustor catalyst bed, or a pressure decrease in the combustor manifold. Steps 216–222 are then executed as described above.

Combustor Run Mode

Figure 5:
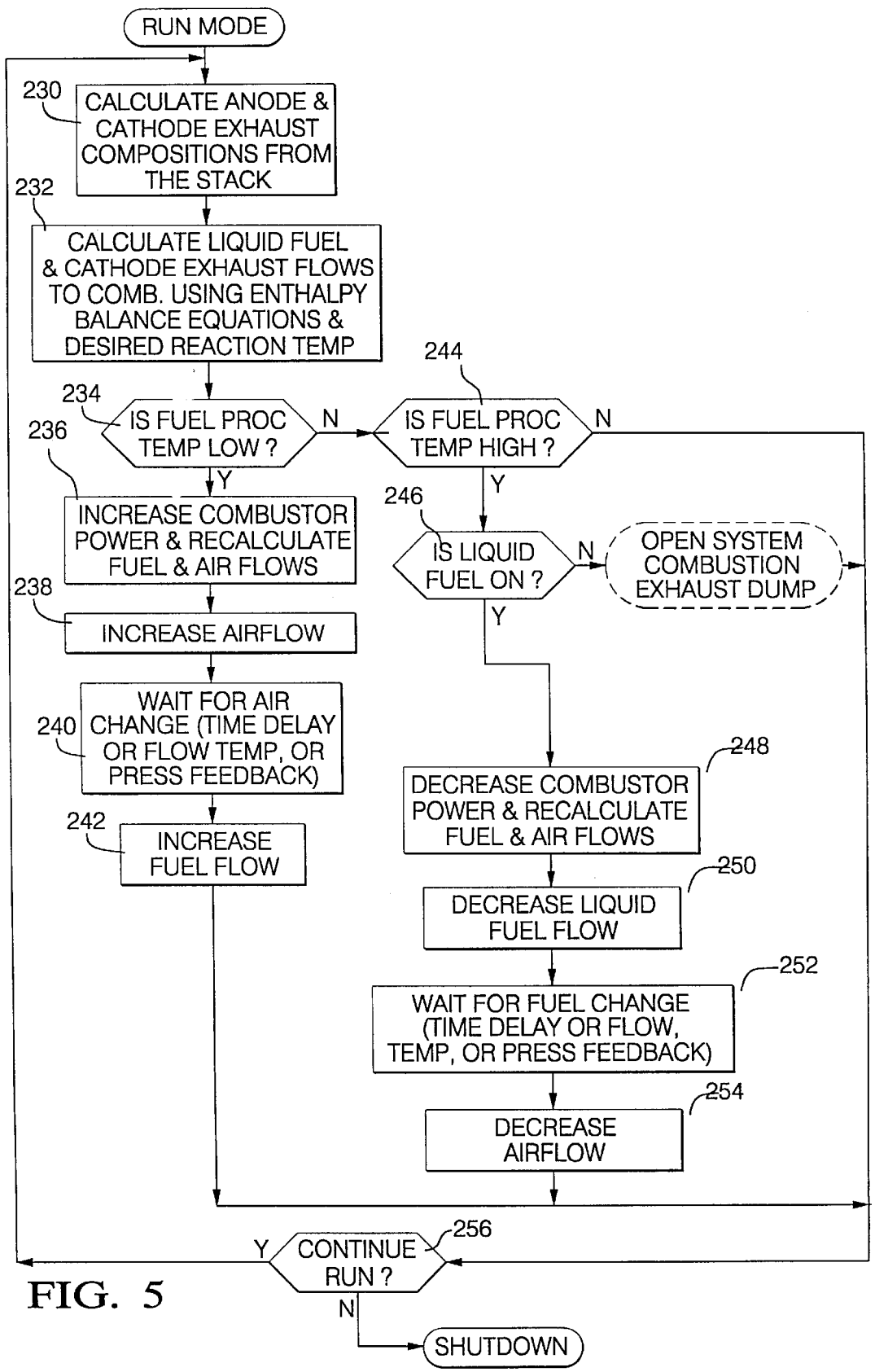
FIG. 5 is a flow diagram depicting the run mode combustor control sequence of the present invention.

FIG. 5 depicts the run mode or sequence of operation of the combustor 34 when the fuel processor 2 is in a run mode. In step 230, the system developed equations are used to calculate the compositions of the anode exhaust streams and the cathode exhaust streams from the fuel cell 22 which are supplied to the combustor 34 as described above. Next, in step 232, the required fuel processor power and reaction temperatures are used to calculate the methanol fuel flow rate and cathode exhaust flow rate to the combustor 34 using the anode exhaust flow rate and composition and the cathode stream composition. Equations 1–16 in Table 1 are used to maintain an enthalpy balance of the reaction by controlling the oxidant stream via regulating the orifice diameter of the air dilution valve 47 and/or the compressor speed.

Next, the fuel processor temperature is checked in step 234, via the output of a temperature sensor thermocouple 235 located between the output of the heat exchanger 14 and the plug flow bed 12 within the fuel processor 2, to determine if it is below a steady state run temperature. If the fuel processor temperature is low, the controller 150 in step 236 increases the combustor output power and recalculates air and fuel flow to the combustor 34 to raise the fuel processor 2 temperature to the steady state set point. In order to increase the combustor power, the controller 150 in step 238 increases the air flow by adjusting the orifice diameter of valve 47 and waits in step 240 for the desired change in the air flow to take effect. The wait period can be a programmed time delay, or based on feedback from the air flow meter, a temperature decrease in the combustor catalyst bed, or a pressure increase in the combustor manifold. Next, the controller 150 increases the methanol fuel flow to the combustor 34 in step 242.

Alternately, if the fuel processor steady state temperature is above the steady state run temperature, i.e., not low, in step 234, the controller 150 determines if the fuel processor steady state temperature is high or exceeds the desired steady state temperature in step 244. If the fuel processor temperature as determined in step 244 is higher than the set point, the controller 150 then determines in step 246 if the methanol fuel flow is turned on to the combustor 34. If the liquid fuel flow is not on, the controller 150 activates the exhaust dump valve 50.

If the methanol fuel flow is on as determined in step 246, the controller 150 decreases combustor power in step 248 and recalculates the desired methanol fuel flow and air flow to the combustor 34 using the enthalpy balance equations 1–16 in Table 1. The controller 150 then decreases methanol fuel flow to the combustor 34 in step 250 and waits a predetermined time for a change in the fuel flow in step 252. Again, the wait period can be a programmed time delay, or based on feedback from the fuel flow meter, a temperature decrease in the combustor catalyst bed, or a pressure decrease in the combustor manifold. In step 254, the controller 150 then adjusts the air flow to the combustor 34 for the decreased liquid fuel flow rate.

At the completion of steps 242 or 254, the controller 150 determines if the system is to remain in a continuous run mode and, if so, control switches back to step 230. If system operation is not to be continued, the controller 150 enters a shutdown sequence as described hereafter and shown in FIG. 6.

Shutdown

Figure 6:
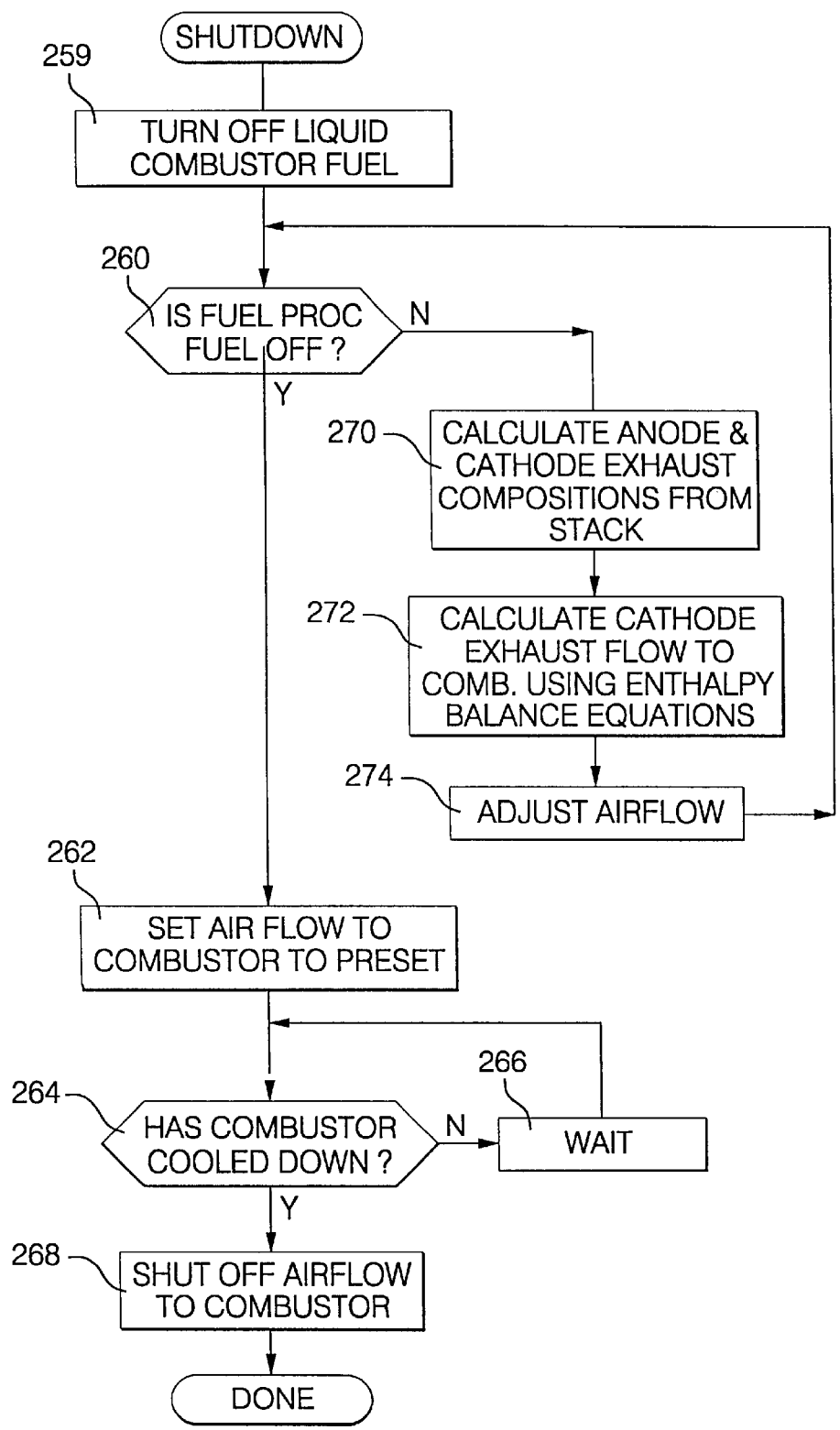
FIG. 6 is a flow diagram of the combustor control shut down sequence according to the present invention.

The control sequence for shutting down the combustor 34 is initiated by a shutdown command or when the controller 150 reaches a shutdown sequence as shown in FIG. 6. The sequence begins at step 259 where the shutdown command initiates the turning off of liquid fuel to the combustor.

In step 260 shown in FIG. 6, the controller 150 determines if the fuel processor fuel supply is turned off. If it is, the controller 150 in step 262 sets the air flow to the combustor 34 to a preset shutdown flow rate. Next, in step 264, the controller 150 determines if the combustor 34 has reached a preset shutdown temperature. If not, the controller 150 executes a wait period 266 and loops through steps 264 and 266 until the combustor temperature has reached its desired shutdown temperature. The controller 150 then shuts off air flow to the combustor 34 in step 268 to complete the combustor shutdown sequence.

Referring back to step 260, if the fuel processor fuel supply has not been turned off, hydrogen and exhaust air are still being supplied to the combustor 34. In this event, the controller 150 in step 270 determines the remaining energy and composition by calculating the anode and cathode exhaust compositions from the fuel cell 22. In step 272, the controller 150 calculates the cathode flow rate and oxidant flow rate from the fuel cell 22 required for the combustor 34 to consume all of the remaining fuel in the apparatus. The controller 150 then adjusts the air flow rate to the combustor 34 in step 274 via air valve 47 as required by the results of step 272 and returns to step 260 until all of the fuel remaining in the apparatus has been consumed. It should be noted that if the energy content remaining in the apparatus is high, the controller 150 may cause the combustor 34 to exhaust the remaining fuel content energy through the system dump valve 50.

Figure 7:
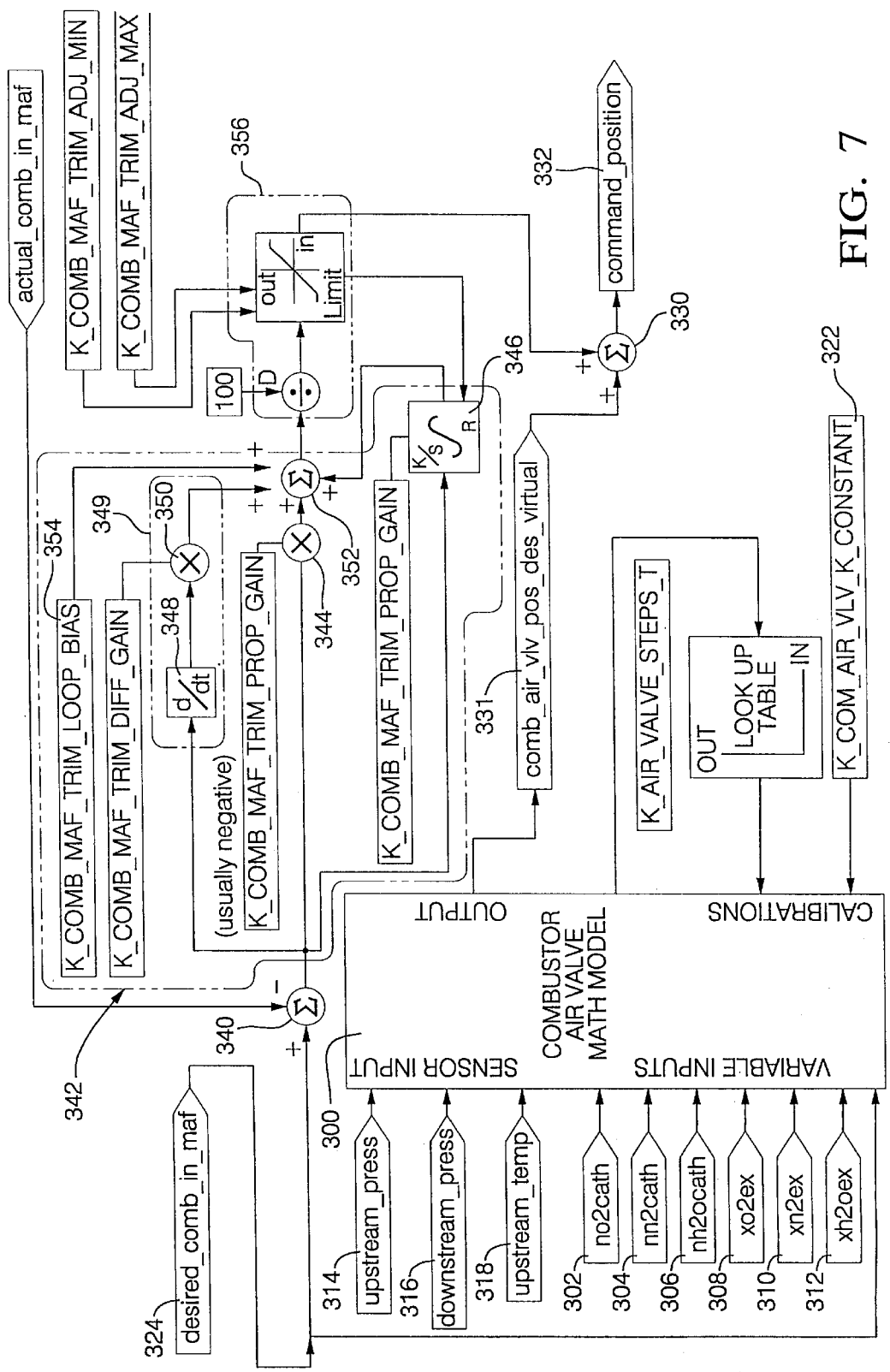
FIG. 7 is a block flow diagram of a flow method according to the present inventionw

Referring now to FIG. 7, there is depicted a control method used to control the effective or cross sectional area of the orifice of the air valve 47, as described above, to control the air flow rate and the oxygen quantity to the combustor 34.

It will be understood that although the flow control method is depicted in block form, the control method can be implemented in either hardware elements or, preferably, software via a control program stored in the memory of the electronic control module of the fuel cell apparatus.

In general, the control method of the present invention utilizes a feed forward control which quickly sets the effective or cross sectional opening of the orifice of air dilution valve 47 for a predetermined air flow rate based on the nitrogen, oxygen and water molar constituents of the air, including atmospheric air and fuel cell cathode effluent which generally is depleted oxygen air, the partial pressures of the constituents of atmospheric air and the expected output of cathode effluent of the fuel cell, as well as a table of valve cross-sectional orifice area versus opening size in a number of discrete steps. In addition, a conventional PID feedback loop is used to implement the final setting of the orifice diameter of the air dilution control valve 47.

As shown in FIG. 7, a combustor air valve math model 300 is implemented by a control program executed by the ECM of the fuel cell apparatus. The math model 300 receives inputs 302, 304 and 306 representing the mole constituents of oxygen, nitrogen and water, respectively, in the cathode effluent of the fuel cell. These molar constituents can be calculated in a separate processor in the fuel cell apparatus or in the ECM which contains the math model 300 (FIG. 7) and by example are: 10% for $O_2$, 75% for $N_2$ and 15% for $H_2O$. Also input to the math model 300 are the partial pressures of the mole fractions of oxygen 308, nitrogen 310 and water 312 in the cathode effluent from the fuel cell. Again, these values are calculated based on the expected cathode effluent constituent make-up of the fuel cell during normal run mode and each other mode of operation of the fuel cell apparatus.

Sensor inputs to the math model 300 include the cathode effluent pressure 314 upstream of valve 47, the pressure 316 downstream of the valve 47 and the cathode effluent temperature 318 upstream of valve 47. These input values are measured by conventional pressure and temperature sensors placed at appropriate locations in the cathode effluent flow line.

Calibrations are also supplied to the math model for the particular mechanical characteristics of the air depletion valve 47 used in the fuel cell apparatus. A constant labeled K_COMB_AIR_VLV_K_CONSTANT 322 is input to the math model 300 to provide an indication of the flow characteristics of the orifice between full open and full closed. For the present example, this constant was 2.0. The $K_{COMB\_AIR\_VLV\_K}$_CONSTANT can also be obtained from a look-up table if the constant changes with valve position.

Finally, another variable input to the math model 300 is the desired combustor air flow 324 which is supplied by solving the enthalpy balance equations as described above.

In the various modes of operation of the combustor described above, the combustor receives either atmospheric air from the compressor 30 or cathode effluent from the fuel cell 22. Based in the particular fuel cell stoichiometry, excess air, typically on the order of double the amount normally required, is supplied to the fuel cell to support fuel cell operation. It is conceivable that different fuel cells may have different cathode stoichiometries such that the amount of oxygen contained in the cathode effluent may be so low as to require air from the compressor to support combustor operation in the run mode.

In one aspect, the math model 300 uses two sets of molar constituents and mole fraction partial pressures. One set is for normal atmospheric air supplied by the compressor during combustor start-up, fuel processor warm-up and fuel processor start-up modes described above. There is a second set of molar constituents and mole fraction partial pressures using oxygen depleted air in the cathode effluent during the normal combustor run modes and combustor shutdown modes of operation (see FIG. 7, 302–312). Preferably, a second model is used to determine values 302 to 312 and supply them to the model 300, shown in FIG. 7.

Thus, in operation, in any of the modes described above, a particular fuel processor output will be calculated. A combustor output heat requirement will then be determined to support the required fuel processor operating temperature. Solution of enthalpy balance equations provides a desired air flow to the combustor 34 to support combustor operation in supplying the required fuel processor heat requirements.

As noted above, any conventional air dilution valve 47 having a variable cross section orifice may be employed in the present control method. A stepper motor controlled air dilution valve 47 is preferred due to precise discrete steps of orifice cross section. The orifice shape may be any conventional orifice shape, including a knife edge orifice, a tube orifice, or an orifice with round edges. etc.

In operation, upon receiving a desired air flow rate 324, the math model 300, using the sensor inputs, the variable inputs and the calibrations described above, will calculate an orifice cross-sectional area to support the desired air flow rate:

$$A_v = \sqrt{\left(\frac{(A_u^2)(k)(m/1000)^2}{[(P_u - P_d)(1000)](2)\rho_{mix})(A_u)^2 + (0.5)(m/1000)^2}\right)} (1 \times 10^6)$$

Where $A_v$ = Valve Area Desired $(m^2/1 \times 10^6$, for $mm^2)$ $A_u$ = upstream flow area (square meters $m^2$)

$k$ = K_COMB_AIR_VLV_K_CONSTANT $m$ = air_vlv_flow_des (G/s/1000 for kg/s)

$P_u$ = Pressure Upstream (kPa×1000 for Pa)

$P_d$ = Pressure Downstream (kPa×1000 for Pa)

$\rho_{mix}$ = Density of the Mixture = $\dfrac{Pmix}{TmixRc}$ $Rc = \dfrac{Ru \text{ (Universal gas constant)}}{MWmix}$ $MWmix = X_{o2}MW_{o2} + X_{n2}MW_{n2} + X_{H2O}MW_{H2O}$.

The math model 300 generates an output 331 labeled COMB_AIR_VLV_POS_DES_VIRTUAL which is used to generate a command position signal 332 specifying a step number for the stepper motor of the air dilution valve 47 which adjusts the orifice cross section to provide the desired air flow rate to the combustor 34. The manufacturer of each valve 47 will supply orifice cross sectional area versus stepper motor steps as part of the design data of the stepper motor operated valve 47. This data is stored in memory in the math model 300 as a lookup table wherein the desired valve area (Av), as calculated above, acts as an address to the lookup table, the output of which is the number of steps for the stepper motor to adjust the orifice of the valve for the desired air flow. The output 331 from the math model 300 is the determined valve step number.

The fast response of the math model 300 results in a fast repositioning of the valve orifice cross section so as to make the valve orifice cross-sectional changes quickly in response to variable load changes on the fuel cell 22, fuel processor 2, and combustor 34.

While the command position signal 332 specifying a desired orifice cross-sectional area in the valve 47 may be the exact cross-sectional area required to support a desired air flow to the combustor 34, it is possible, and probably typical, due to valve tolerances, fuel cell operation variations, etc., for the actual air flow to the combustor 34, as measured by the mass flow meter 157, to vary from the desired or calculated predetermined air flow rate. Thus, the output 331 from the math model 300 is considered an initial set point for the air dilution valve orifice cross section, but a set point which is quickly achieved due( to the feed forward structure of the math model 300.

In order to fine tune the cross-sectional area of the orifice to support a desired air flow rate to the combustor 34, any error between the actual flow rate and the predetermined or calculated air flow rate is determined in step 340. This error is supplied to a feedback loop 342 to generate signals to the stepper motor of the valve 47 to make fine changes in the cross-sectional area of the orifice to reduce the error to zero.

Although, any control feedback may be employed which compares a set point or actual desired air flow rate with a measured air flow rate to develop an error signal, with the error signal used to adjust the cross sectional area of the orifice of the valve 47 to reduce the error signal to zero, a PID control loop, shown in FIG. 7 is preferred.

The PID loop 342 includes proportional, integral and derivative terms 344, 346 and 348, respectively, which are added to or subtracted from the error signal to develop the desired output control signal. More specifically, the D term has two parts, 348 and 350, which is designated as 349.

Conventional PID control loops may be implemented in either hardware or software. For example, in a conventional hardware implementation, the PID terms 344, 346 and 349 may be provided by separate amplifier, integrator and differentiator circuits. Alternately, and preferred in the present invention, these terms are used in a software implementation of the ECM by a conventional algorithm to generate values for the control signal in response to applied values for measurement and set point inputs of the orifice cross-sectional area.

The proportional term 344 represents a linear gain factor related to the magnitude of the error signal and the magnitude of the control signal necessary to achieve the desired orifice cross-sectional area. The integral term 346 is a long time constant linear gain term related to the integral of the error signal used to reduce to the residual error that would otherwise occur in a proportional only control loop between the set point and measured air flow values. The derivative term 349 is the derivative of the error signal and enhances system response to short term transients without reducing the long term accuracy benefits of the integral term.

Further, as is conventional in PID control loops, calibrations or gains are supplied to each term 344, 346 and 349 to trim the operation of the PID loop 342.

As shown in FIG. 7, the outputs of the multipliers 350 and 344 and the integral term 346 are summed in a summing junction 352 along with a K_COMB MAF_TRIM_LOOP_BIAS gain term 354. This calibration or gain term 354 defines the default position of the valve 47 when no error exists between the actual air flow to the combustor 34 and the predetermined desired air flow to the combustor 34. The calibration term 354 inputs a number into the FID control loop 342, preferably into the summing junction 352. In one aspect, the calibration term 354 inputs a number into the PID control loop 342 when the outputs of the proportional, integral and derivative terms 344, 346 and 349 are zero.

The output of the summing junction 352 is input to a scaler or divider 356 which divides the summer output by 100.

The output of the scaler 356 is adjusted by K_COMB_MAF_TRIM_ADJ_MIN and K_COMB MAF_TRIM_ADJ_MAX constants which define the minimum and maximum limits for the error signal adjustment signal. In general, these limits stop the integrator 346 from Charging up or charging down too far.

After the limit control, the output of the divider 356 is summed in step 330 with the output 331 of the math model 300.

As the PID control loop 342 has a slower response time than the quicker response of the generatxon of the command position signal 331 from the math model 300, the cross-sectional area of the orifice of the air dilution valve 47 will be quickly adjusted to the command position set by the output 331 of the math model 300 and then more slowly adjusted by the PID loop 342 to eliminate any error between the actual air flow to the combustor 34 as measured by the mass flow meter 157 and the desired or predetermined air flow to the combustor 34 as established by the enthalpy balance equations described above.

In summary, there has been disclosed a unique combustor air flow control method which provides quick response in establishing a predetermined air flow to the combustor over varying power requirements imposed on the combustor. The control method applies a feed forward control output with a conventional FID control loop error output to precisely control the cross-sectional area of the orifice of the air dilution valve to control the air flow to the combustor. The present control methodology also compensates for molar fraction deviations of oxygen depleted air in the cathode effluent from the fuel cell to support the desired heat output of the combustor.

TABLE 1

Operating Equations (1) $P_C = P_{MeOH} + P_{H2}$ (KW)
where: $P_C$ = combustor power, $P_{MeOH}$ = power from MeOH, $P_{H2}$ = power from hydrogen (2) $P_{MeOH} = 636\, n_{MeOH}$
where: $n_{MeOH}$ = molar flow of MeOH (3) $P_{H2} = 242\, n_{H2}$
where: $n_{H2}$ = molar flow of hydrogen (4) $n_{CATH} = (n_{MeOH} \cdot dh(MeOH) + nCO_2 \cdot dh(CO_2) + n_{H2} \cdot dh(H_2) + nH_2O \cdot dh(H_2O) + n_{N2} \cdot dh(N_2))/dh(CATH)$
where: $n_{CATH}$ = molar flow of cathode input to combustor; $nCO_2$, $n_{H2}$, $nH_2O$, $n_{N2}$ = molar flows of $CO_2$, $H_2$, $H_2O$, and $N_2$, respectively, in the anode input to the combustor; $dh(X)$ = difference of the enthalpy for given component X from inlet of combustor to outlet of combustor.

(5) $dh(MeOH) = H(MeOH, T_{MeOH}) - H(CO_2, T_{CRT}) - 2 \cdot H(H_2O, T_{CRT}) + 1.5 \cdot,$
$H(O_2 - T_{CRT})$
where: $H(X, T_y)$ = enthalpy of component X at temperature $T_y$, $T_{MeOH}$ = temperature of liquid MeOH supplied to vaporizer, $T_{CRT}$ = combustor reaction temperature (combustion out temperature)

(6) $dh(CO_2) = H(CO_2, Tan) - H(CO_2, T_{CRT})$
where: Tan = anode temperature into combustor (7) $dh(H_2) = H(H_2, Tan) + 0.5 \cdot H(O_2, T_{CRT}) - H(H_2O, T_{CRT})$ (8) $dh(H_2O) = H(H_2O, Tan) - H(H_2O, T_{CRT})$ (9) $dh(N_2) = H(N_2, Tan) - H(N_2, T_{CRT})$

(10) $dh(CATH) = \%\, O_2 \cdot dh(CATH\, O_2) + \%\, N_2 \cdot dh(CATH\, N_2) + \%\, H_2O \cdot dh(CATH\, H_2O)$
where: $\%\, O_2$, $\%\, N_2$ and $\%\, H_2O$ are mole fractions (percentages) of oxygen, nitrogen and water, respectively, in the cathode input.

TABLE 1-continued

Operating Equations

(11) $dh(CATH\ O_2) = H(O_2, T_{CA}) - H(O_2, T_{CRT})$
where: $T_{CA}$ = Cathode Input Temperature
(12) $dh(CATH\ N_2) = H(N_2, T_{CA}) - H(N_2, T_{CRT})$
(13) $dh(CATH\ H_2O) = H(H_2O, T_{CA}) - H(H_2O, T_{CRT})$
(14) $m_{CATH} = n_{CATH} \cdot mw_{CATH}$
where: $mw_{CATH}$ = molecular weight of cathode input stream
(15) $mw_{CATH} = \%\ O_2 \cdot mw_{O2} + \%\ N_2 \cdot mw_{N2} + \%\ H_2O \cdot mw_{H2O}$
(16) $m_{MeOH} = n_{MeOH} \cdot mw_{MeOH}$

What is claimed is:

1. A method of operating a combustor to heat a fuel processor in a fuel cell apparatus in which the fuel processor generates hydrogen from hydrocarbon fuel for supplying a fuel cell, the fuel cell discharging oxygen containing cathode effluent, the method comprising the steps of:
   (a) providing a fuel stream to the combustor;
   (b) providing an air flow stream to the combustor, the air flow stream including at least one of a first air source and the cathode effluent from the fuel cell;
   (c) determining the power input requirement of the fuel processor;
   (d) determining the output power of the combustor to support the determined power requirement of the fuel processor; and
   (e) regulating the air flow stream to the combustor to control the temperature of the combustor, by controlling the effective cross sectional area of an output flow orifice of an air flow regulator in response to the constituent makeup of the air stream.

2. The method of claim 1, wherein the air flow regulator has a variable cross section orifice varying in a discrete plurality of steps between full open and full closed positions, the orifice having a known cross-sectional area at each discrete step.

3. The method of claim 2, wherein the regulating step comprises the steps of:
   (i) adjusting the orifice to a first cross-sectional area in response to the constituent makeup of the cathode effluent; and
   (ii) adjusting the cross-sectional area of the orifice based on the difference between the actual air flow and a predetermined air flow to the combustor using a PID control loop.

4. The method of claim 2, wherein said air flow regulator is connected to an exhaust to bleed air from the air flow stream.

5. The method of claim 3, wherein the regulating step further comprises limiting the size of the cross section change of the air flow regulator orifice to a maximum and a minimum cross section.

6. The method of claim 3, wherein the regulating step further comprises summing the first cross-sectional area of the diameter of the orifice of the air flow regulator with a diameter adjustment determined using the error signal representing the difference between the measured actual air flow to the combustor and the predetermined air flow.

7. The method of claim 6 wherein the error signal is generated by a PID control loop.

8. The method of claim 1 wherein the regulating step comprises controlling the direction of the air flow stream by directing the air flow stream either primarily from the first air source to the combuster, or from the first air source to and through the cathode portion of the fuel cell thereby providing said cathode effluent which is supplied to the combustor.

9. The method of claim 1 further comprising regulating the fuel stream to the combustor based on the power requirement of the fuel processor.

10. A method of operating a combustor to heat a fuel processor in a fuel cell apparatus in which the fuel processor generates hydrogen from hydrocarbon fuel for supplying a fuel cell, the fuel cell discharging oxygen containing cathode effluent, the method comprising the steps of:
   (a) providing a fuel stream to the combustor;
   (b) providing an air flow stream to the combustor, the air flow stream including at least one of a first air source and the cathode effluent from the fuel cell;
   (c) determining the power input requirement of the fuel processor;
   (d) determining the output power of the combustor to support the determined power requirement of the fuel processor; and
   (e) regulating the air flow stream to the combustor to control the temperature of the combustor by controlling the direction of the air flow stream by directing the air flow stream either primarily from the first air source to the combustor, or from the first air source to and through the cathode portion of the fuel cell thereby providing said cathode effluent which is supplied to the combustor.

11. A method of operating a combustor to heal a fuel processor in a fuel cell apparatus in which the fuel processor generates hydrogen from hydrocarbon fuel for supplying a fuel cell, the fuel cell discharging oxygen containing cathode effluent, the method comprising the steps of:
   (a) providing a fuel stream to the combustor;
   (b) providing an air flow stream to the combustor, the air flow stream including at least one of a first air source and the cathode effluent from the fuel cell;
   (c) determining the power input requirement of the fuel processor;
   (d) determining the output power of the combustor to support the determined power requirement of the fuel processor; and
   (e) regulating the air flow stream to the combustor to control the temperature of the combustor by bleeding air from the air flow stream.

12. A method according to claim 11, wherein the bleeding of air is controlled with an air flow regulator in response to the constituent makeup of the air stream.

13. A method according to claim 12, wherein the air flow regulator has a variable cross section orifice varying in a discrete plurality of steps between full open and full closed positions, the orifice having a known cross-sectional area at each discrete step.

14. A method according to claim 11, wherein the regulating step additionally comprises controlling the direction of the air flow stream by directing the air flow stream either primarily from the first air source to the combustor, or from the first air source to and through the cathode portion of the fuel cell thereby providing said cathode effluent which is supplied to the combustor.

* * * * *